United States Patent

Yokota et al.

[11] Patent Number: 5,848,032
[45] Date of Patent: Dec. 8, 1998

[54] DISK RECORDING APPARATUS FOR GENERATING SEARCH POSITIONAL INFORMATION INDICATIVE OF MARKED POINTS ON A DISK

[75] Inventors: Teppei Yokota; Junichi Aramaki, both of Chiba; Nobuyuki Kihara, Tokyo, all of Japan

[73] Assignee: Sony Corporation, Tokyo, Japan

[21] Appl. No.: 597,979

[22] Filed: Feb. 7, 1996

Related U.S. Application Data

[63] Continuation of Ser. No. 117,449, Sep. 7, 1993, Pat. No. 5,544,165.

[30]       Foreign Application Priority Data

Sep. 7, 1992   [JP]   Japan ..................................... 4-264321

[51] Int. Cl.⁶ .................................................. G11B 17/22
[52] U.S. Cl. .................................. 369/32; 369/56; 369/47
[58] Field of Search ................................. 369/32, 47, 56, 369/13, 44.28, 275.3, 58, 275.4, 48, 111, 44.26, 44.27

[56]             References Cited

U.S. PATENT DOCUMENTS

| | | | |
|---|---|---|---|
| 4,587,579 | 5/1986 | Cocke et al. .............................. | 360/75 |
| 5,050,014 | 9/1991 | Maeda et al. .............................. | 360/75 |
| 5,115,240 | 5/1992 | Fujiwara et al. .......................... | 341/51 |
| 5,153,861 | 10/1992 | Maeda et al. .............................. | 369/32 |
| 5,317,553 | 5/1994 | Ohga et al. ............................... | 369/54 |
| 5,377,167 | 12/1994 | Maeda et al. .............................. | 369/49 |
| 5,388,093 | 2/1995 | Yoshida et al. .......................... | 369/124 |
| 5,392,265 | 2/1995 | Takezawa ................................. | 369/32 |
| 5,544,165 | 8/1996 | Yokota et al. ............................. | 369/32 |

FOREIGN PATENT DOCUMENTS

| | | |
|---|---|---|
| 0 377 340 | 7/1990 | European Pat. Off. . |
| 58--048280 | 3/1983 | Japan . |
| 2139782 | 5/1990 | Japan . |
| 2175 436 | 11/1986 | United Kingdom . |

*Primary Examiner*—Ali Neyzari
*Attorney, Agent, or Firm*—Limbach & Limbach L.L.P.

[57]              ABSTRACT

A disc recording apparatus which uses a disc recorded with address data beforehand and writes the TOC (information about recorded data) in a predetermined area on the disc. When a predetermined key is operated during recording, an address on the disc corresponding to an operation point of the key is written to the predetermined area as the TOC, generating positional information for data retrieval which substantially has no offset from a marker point on the disc. In reproduction, the TOC is read before starting reproduction, so that a desired marker point can be detected promptly based on the positional information of the TOC data.

3 Claims, 3 Drawing Sheets

DISK RECORDING APPARATUS FOR GENERATING SEARCH POSITIONAL INFORMATION INDICATIVE OF MARKED POINTS ON A DISK

This is a continuation of application Ser. No. 08/117,449, filed Sep. 7, 1993, now U.S. Pat. No. 5,544,165.

BACKGROUND OF THE INVENTION

Field of the Invention:

The present invention relates to a disc recording apparatus.

BACKGROUND OF THE INVENTION

It is known that, for example while recording a lecture a predetermined key on a tape recorder may be operated at a point of time of interest to records on the tape a marker (or a cue signal) having a frequency outside the audible range or a frequency low enough not to hindering the listening to the recorded tape.

When the above-mentioned tape is fast reproduced, the frequency of the recorded marker gets in the audible range to provide convenient means for retrieving desired recorded contents in a tape editing operation for example.

However, when a magnetic tape is used for a recording medium, the tape must be fast forwarded or rewound to get to a marked point, thereby making the data retrieval operation tedious.

Another problem is that, when a user operates a marker key upon hearing a topic of interest, the marker is recorded not at the head of the topic of interest but at a point somewhere downstream thereof.

Still another problem is that a marker may also be recorded by an inadvertent marker key operation, which may be a hindrance to a desired marker search.

OBJECTS AND SUMMARY OF THE INVENTION

It is therefore an object of the present invention to provide a disc recording apparatus which uses a disc as a recording medium to facilitate a marked point search and generates search positional information to substantially eliminate an offset between the head of a desired data and a marked point.

In carrying out the invention and according to one aspect thereof, there is provided a disc recording apparatus which uses a disc previously recorded with address data and records information about recorded data in a predetermined area on the disc, wherein, when a predetermined key is operated during a recording operation, an address corresponding to the key operation is written to the predetermined area as the information about the recorded data.

The above-mentioned constitution allows, upon operation of the predetermined key during recording, generation of positional information corresponding to the key operation to be written to the predetermined area on the disc. Consequently, in reproduction, the positional information allows to detection of the desired marked point promptly.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

The invention will be described using one embodiment thereof in which a disc recording apparatus according to the invention has been applied to a magneto-optical disc recording/reproducing apparatus of voice data companding type.

Figure 1:
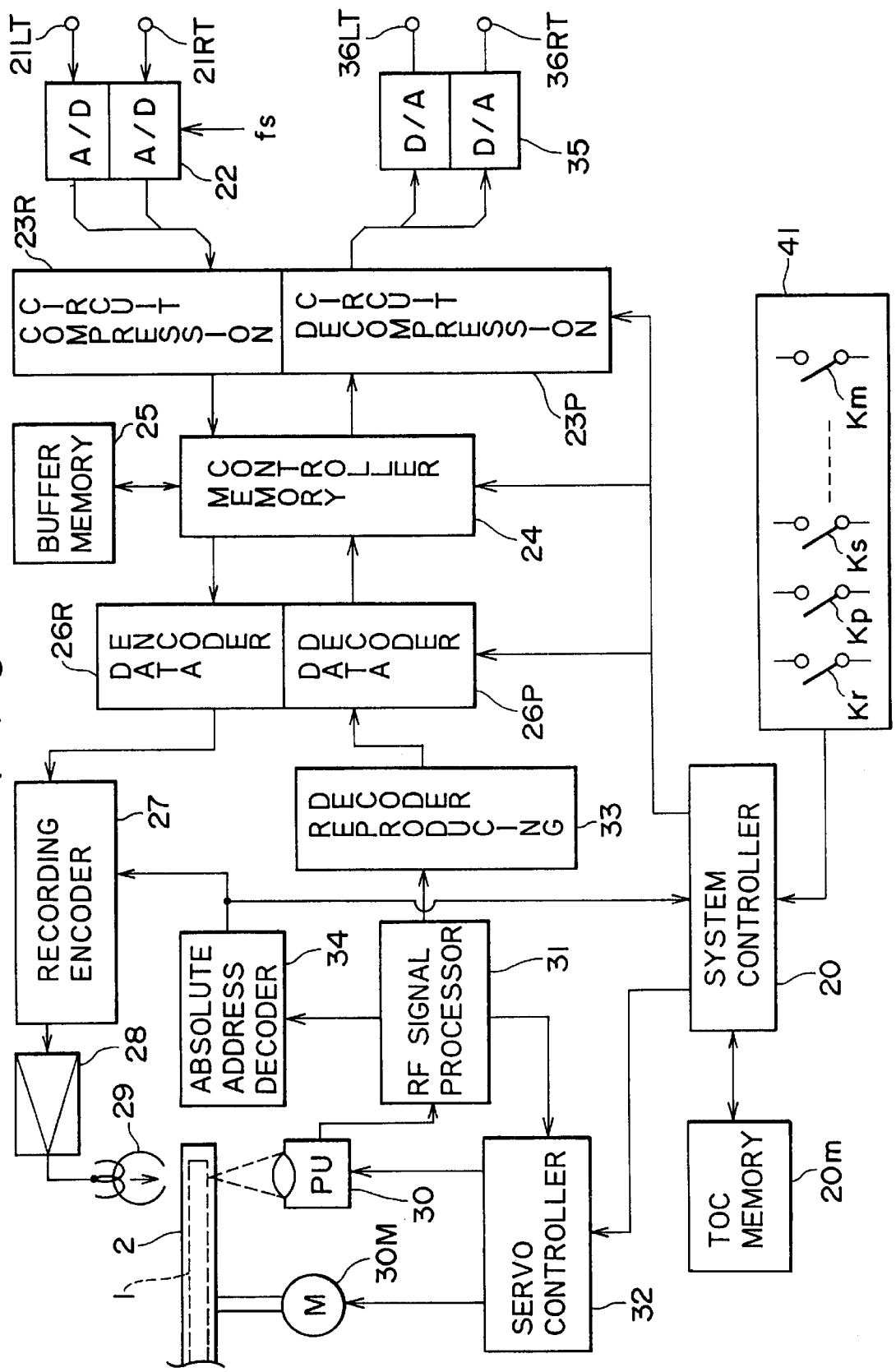
FIG. 1 is a block diagram illustrating a constitution of one embodiment of the invention.

Now referring to FIG. 1, reference numeral 1 indicates an optical disc. In this embodiment, this optical disc is a magneto-optical disc on which data can be recorded, reproduced, and erased.

The disc 1 has an external diameter of 64 mm and is spirally formed with a recording track with a pitch of 1.6 microns, for example. The disc 1 is rotated at a constant linear velocity of 1.2 to 1.4 m/s, for example. If audio information to be recorded consists of digital signals which are recorded in a compressed form, 130 megabytes or more of such information can be recorded/reproduced on the disc 1.

The disc 1 is formed with a pre-group for optical spot control (or tracking control) beforehand. Especially, in this embodiment, this pre-group is recorded with an absolute address code superimposed on a wobbling signal for tracking. It should be noted that the disc 1 is accommodated in a dust and scratch proof disc cartridge 2.

The disc 1 is also recorded with information at an inner most track thereof about recorded audio data. This information is generally called a TOC (Table Of Contents) and contains the number of recorded pieces of music, information about a recorded position of each piece of music, and a playing time of each piece of music, and the like.

Referring again to FIG. 1, the recording/reproducing apparatus is contrived so that its construction is simplified as far as possible by employing integrated circuits. First, recording data onto the magneto-optical disc will be described. It should be noted that the recording/reproducing apparatus is constituted so that a mode select signal R/P coming from a system controller (a microcomputer) 20 switches between recording and playback modes.

The system controller 20 is connected to a keyboard 41 having a plurality of keys including a record key Kr, a playback key Kp, a stop key Ks, and a marker key Km for example. An operating mode is selected by operating one of these keys.

In this embodiment, the system controller is also connected to a TOC memory 20m which temporarily stores the TOC data such as positions and playing times of recorded data. It should be noted that the memory 20m can be provided in RAM in the microcomputer or in a buffer memory 25 which will be described.

An analog audio signal of two channels entered via a pair of input terminals 21LT and 21RT is sampled by an A/D converter 22 at a sampling frequency of 44.1 kHz to be converted into a digital signal with each sampling value consisting of 16 bits. The 16-bit digital signal is fed to a data compression circuit 23R to be compressed by one fifth in this embodiment. The data is compressed by ADPCM (Adaptive Delta Pulse Code Modulation) of 4-bit quantization number, for example.

Data is compressed also by a method in which the input digital data is divided into a plurality of bands so that they are wider as they get higher. Each of the bands is formed with a block made up of a plurality of samples (it is recommended that the number of samples is the same with each band). The data is then orthogonally converted block by block to obtain coefficient data, and bit assignment for each block is made based on the coefficient data. This data compression method takes a human auditory sense characteristic into account, realizing a high-efficiency data compression as disclosed in U.S. Pat. No. 5,115,240.

Thus, the digital data DA obtained by the A/D converter 22 is compressed by one fifth by the compression circuit 23R into compressed data da to be sent to a buffer memory 25 controlled by a memory controller 24. In this embodiment, the buffer memory 25 is a one-megabit DRAM.

The memory controller 24 sequentially reads the compressed data da from the buffer memory 25 at a transfer rate five times as high as a rate at which the compressed data da has been written to the buffer memory 25 unless no track jump has been caused on the disc 1 by a vibration or the like during recording. The memory controller 24 sends the read data to a data encoder 26R.

If a track jump has been detected during recording, the memory controller 24 suspends transferring data to the encoder 26R and stores the compressed data da coming from the compression circuit 23R in the buffer memory 25. When an affected recording position is corrected, the memory controller restarts transferring the data to the encoder 26R.

A track jump can be detected by installing a vibrometer on the recording/reproducing apparatus to determine whether a vibration detected is large enough to cause the track jump, by way of example. As mentioned above, the disc 1 of this embodiment is recorded beforehand with an absolute address code superimposed over a wobbling signal for tracking when forming a pre-group. Therefore, it is also possible to read the absolute address code during recording, detecting a track jump by the decoded output. A track jump may also be detected by performing a logic OR operation between an output of the vibrometer and a continuity of the absolute address code. It should be noted that, when a track jump has taken place, the power of a laser for magneto-optical recording is lowered or turned off.

The recording position affected by a track jump may be corrected by using the above-mentioned absolute address code. It is apparent from the above description that the buffer memory 25 must have a storage size at least enough for holding the compressed data da in an amount which may be stored between detection of a track jump and correction of an affected recording position. In this embodiment, the buffer memory 25 has a storage size of one megabit as mentioned above, which sufficiently satisfies the above-mentioned condition.

In the above-mentioned case, the memory controller 24 performs memory control in a normal recording operation so that data is held in the buffer memory 25 in as small an amount as possible. For example, when data held in the buffer memory 25 has exceeded a predetermined level, the memory controller 24 reads a predetermined amount of data, data for 32 sectors (one sector is one CD-ROM sector = about 2 kilobits) for example, from the buffer memory 25 to always allocate a write space larger than the predetermined data level in the buffer memory.

The data encoder 26R encodes the compressed data da coming from the buffer memory 25 into data having a CD-ROM sector structure. One unit of data for 32 sectors including audio data is hereinafter referred to as a cluster.

The data output from the data encoder 26R on a cluster basis is fed to a recording encoder 27. In the recording encoder 27, the data is coded for error detection and correction and modulated for recording by EFM (Eight-to-Fourteen Modulation) encoding in this example. This embodiment uses an error detection and correction code derived from a CIRC (Cross Interleave Reed-Solomon Code) with the interleave changed. Since the data to be recorded is intermittent data on a cluster basis, each cluster consisting of 32 sectors is added with a plurality of linking sectors at both ends thereof for connecting clusters.

The data encoded by the recording encoder 27 is fed to a magnetic head 29 via a magnetic head driver 28. The magnetic head driver 28 drives the magnetic head 29 so that it applies a modulated magnetic field according to the fed data to the disc 1 (a magneto-optical disc). The data to be recorded fed to the head 29 consists of clusters and is recorded intermittently.

The disc 1 is accommodated in the cartridge 2. When the disc 1 is loaded in the apparatus, a shutter of the cartridge 2 opens to expose the disc 1. A spindle of disc drive motor 30M is inserted into a spindle insertion opening of the disc 1 to rotate it. The disc drive motor 30M is controlled by a servo controller 32 to rotate at a constant linear velocity of 1.2 to 1.4 m/s.

The magnetic head 29 is disposed opposite to the disc 1 exposed through a shutter opening of the cartridge 2. Opposite to the magnetic head, an optical head 30 is disposed with the disc 1 in between. The optical head 30 comprises a laser beam source, a collimator lens, an objective lens, a polarization beam splitter, a cylindrical lens, and a beam detector, for example. In data recording, a laser beam having a constant power which is higher than in data reproduction is radiated to a recording track of the disc 1. Data is recorded on the disc 1 by thermo-magnetic recording provided by the radiation of the laser beam and the modulated magnetic field provided by the magnetic head 29. Both the magnetic head 29 and the optical head 30 are disposed so that they move along the radius of the disc 1 together.

Meanwhile, in recording, an output of the optical head 30 is fed to an absolute address decoder 34 via an RF signal processor 31 to extract an absolute address code from the pre-group of the disc 1 and be decoded. Decoded absolute address information is fed to a recording encoder 27 to be inserted in the data to be recorded as the absolute address information to be recorded on the disc 1. The absolute address information from the absolute address decoder 34 is also fed to a system controller 20 to be used for recognizing a recording position and for positional control.

A signal from the RF signal processor is fed to the servo controller 32 to form from a signal coming from the pre-group of the disc 1 a signal for controlling the motor 30M to run at the constant linear velocity.

The disc 1 loaded in the apparatus is rotated by the disc drive motor 30M. In the same manner as recording, the motor 30M is controlled by the servo controller 32 so that the disc 1 runs at the same velocity as in above-mentioned recording, that is, a constant linear velocity of 1.2 to 1.4 m/s.

In reproduction, the optical head 30 picks up a reflected light from a target track produced by radiating a laser beam to it. In doing so, the optical head 30 detects a focus error by astigmatic method for example and detects a tracking error by push-pull method for example, detecting a difference between polarizing angles (Kerr rotational angles) of the reflected light from the target track to output a reproduced RF signal.

An output from the optical head 30 is fed to the RF signal processor 31. The RF signal processor 31 extracts a focus error signal and a tracking error signal from the output of the optical head 30 to feed them to the servo controller 32. At the same time, the RF signal processor 31 binarizes a reproduced signal to be fed to a reproducing decoder 33.

The servo controller 32 controls a focus of the optical head 30 so that the above-mentioned focus error signal becomes zero and a tracking of the optical head 30 so that the above-mentioned tracking error signal becomes zero.

The RF signal processor 31 extracts an absolute address code from the pre-group of the disc 1 to feed the code to the absolute address decoder 34. Absolute address information from the decoder 34 is fed to the system controller 20 to be used by the servo controller 32 for reproducing position control in a radial direction of the disc 1. The system controller 20 can also use address information on a sector basis extracted from the reproduced data to manage a position on a recording track being scanned by the optical head 30.

During the reproduction, compressed data read from the disc 1 is written to the buffer memory 25 to be read from it for decompression. Since there is a difference between transfer rates of the compressed data and the decompressed data, the data is read from the disc 1 intermittently so that the data stored in the buffer memory 25 will not get below a predetermined level.

The data read from the disc 1 is fed to the reproducing decoder 33 via the RF signal processor 31. Upon receiving a binarized reproduced signal from the RF signal processor 31, the reproducing decoder 33 performs such processing that corresponds to the processing of the recording encoder 27 as EFM decoding and decoding and interpolation for error detection and correction. Output data from the reproducing decoder 33 is fed to a data decoder 26P.

The data decoder 26P decodes data having the CD-ROM sector structure into the original compressed data.

Output data from the data decoder 26P is transferred to the buffer memory 25 which is controlled by the track jump memory controller 24. The output data is written to the buffer memory at a predetermined rate.

If no track jump has been caused by a vibration or the like during the reproduction, the memory controller 24 reads the data compressed by the data decoder 26P at a transfer rate of about ⅕ of the data writing rate and transfers the read data to a data decompression circuit 23P. At this time, the memory controller 24 controls the buffer memory read/write operations so that the data stored in the buffer memory 25 will not get below the predetermined level.

If a track jump has been detected during the reproduction, the memory controller 24 suspends writing data from the data decoder 26P to the buffer memory 25, only transferring data to the data decompression circuit 23P. When a reproducing position affected by the track jump has been rectified, the memory controller 24 restarts writing data from the data decoder 26P to the buffer memory 25.

Occurrence of a track jump is determined in the same manner as in the recording operation; that is, by means of a vibrometer, by means of the absolute address code recorded in the pre-group of an optical disc superimposed on a wobbling signal for tracking control (a method in which continuity of the decode output of the absolute address decoder 34 is detected), or by means of performing a logic OR operation between an output of the vibrometer and the continuity of the absolute address code. Alternatively, the absolute address information and the address information on a sector basis extracted from the reproduced dada as mentioned above may be used for the determination.

During the reproduction, the buffer memory 25 must have a data storage size at least enough for always storing data for a period of time between track jump detection and correction of an affected reproducing position. This is because such a storage size ensures data transfer from the buffer memory 25 to the data decompression circuit 23P without interruption if a track jump occurs. In this embodiment, the buffer memory 25 is provided with a 1-megabit storage size, which satisfies the above-mentioned condition sufficiently.

As mentioned earlier, the memory controller 24 controls the buffer memory 25 so that, in a normal operation, it stores more than the above-mentioned minimum quantity of data as far as possible. In this case, if the amount of the data stored in the buffer memory 25 has dropped below the predetermined level, data is intermittently captured from the disc 1 through the optical head 30 to be written to the buffer memory via the data decoder 26P, always providing a data read space larger than a space for the predetermined data amount.

The data decompression circuit 23P decompresses the ADPCM data to about five times as large. This is inverse to the compression performed in recording. Resultant digital audio data from the data decompression circuit 23P is fed to a D/A converter 35 to be converted into analog audio signals of two channels. These signals are output from a pair of output terminals 36LT and 36RT.

Normally, when recording a plurality of pieces of music piece by piece, a track number is assigned at a start of each piece and an absolute address of the recording start position on the disc is recorded as TOC data. Track numbers assigned are updated sequentially as pieces of music are recorded. When recording a plurality of pieces of music in a single recording session, an inter-piece silent interval is detected to automatically update a track number at a start of each piece and an absolute address at that position on the disc is recorded as the TOC data.

Thus, normally, the recording start time and the inter-piece silent interval are detected to update a track number at a start of each piece and the updated track number is recorded in the TOC. In reproduction, the track number recorded in the TOC is referenced for indexing. Conventionally, however, a midway between ends of a piece of music or any other desired positions are not set as indexing points.

In this embodiment, in addition to the above-mentioned TOC data, a recording position (an absolute address on the disc) at operating the marker key Km during recording or a recording position preceding it is recorded in the TOC area on the disc 1 as a marker placing point. At that key operating point, a track number of a piece of music is updated.

Figure 2:
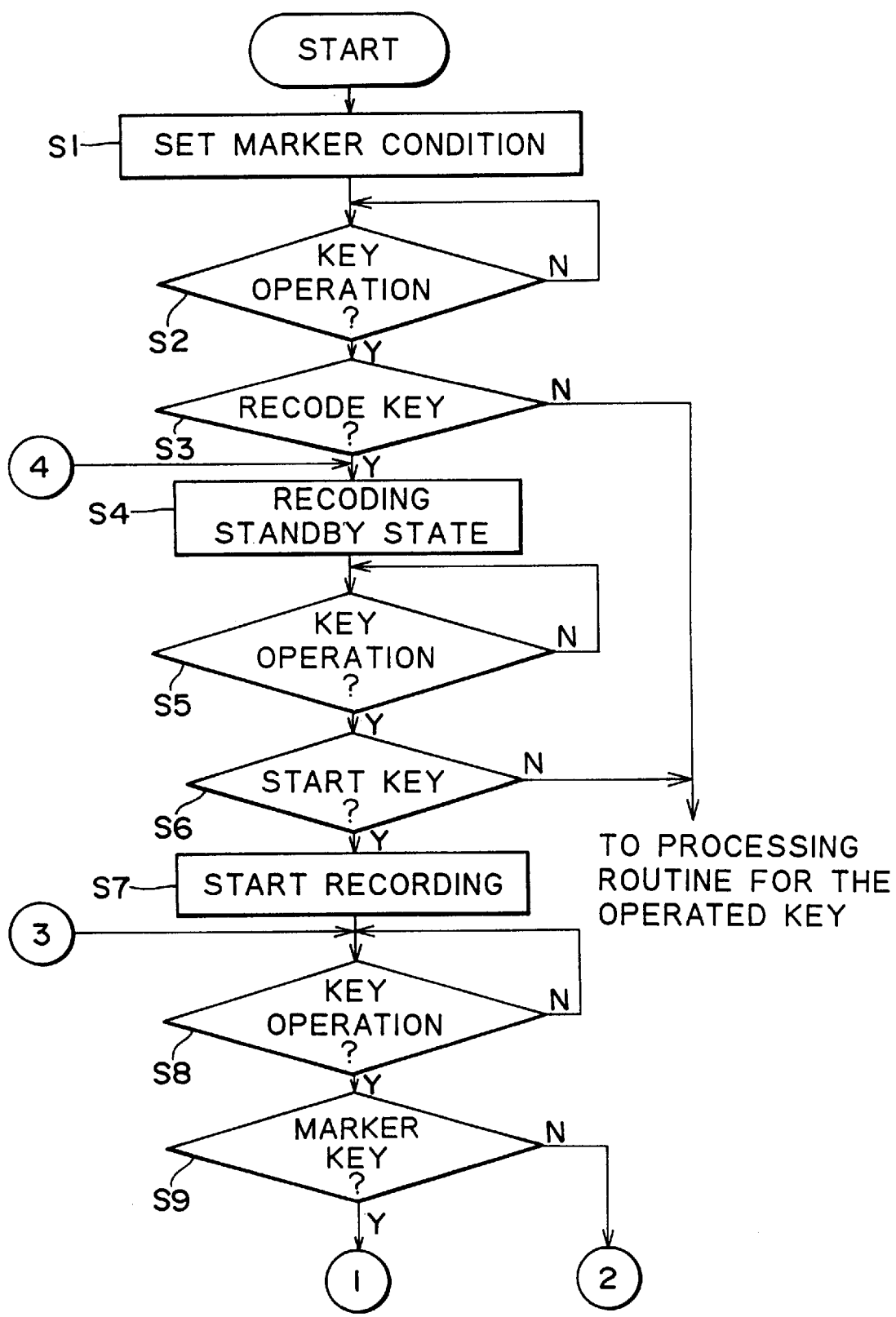
FIG. 2 is part of a flowchart describing an operation of the disc recording apparatus according to the invention.
Figure 3:
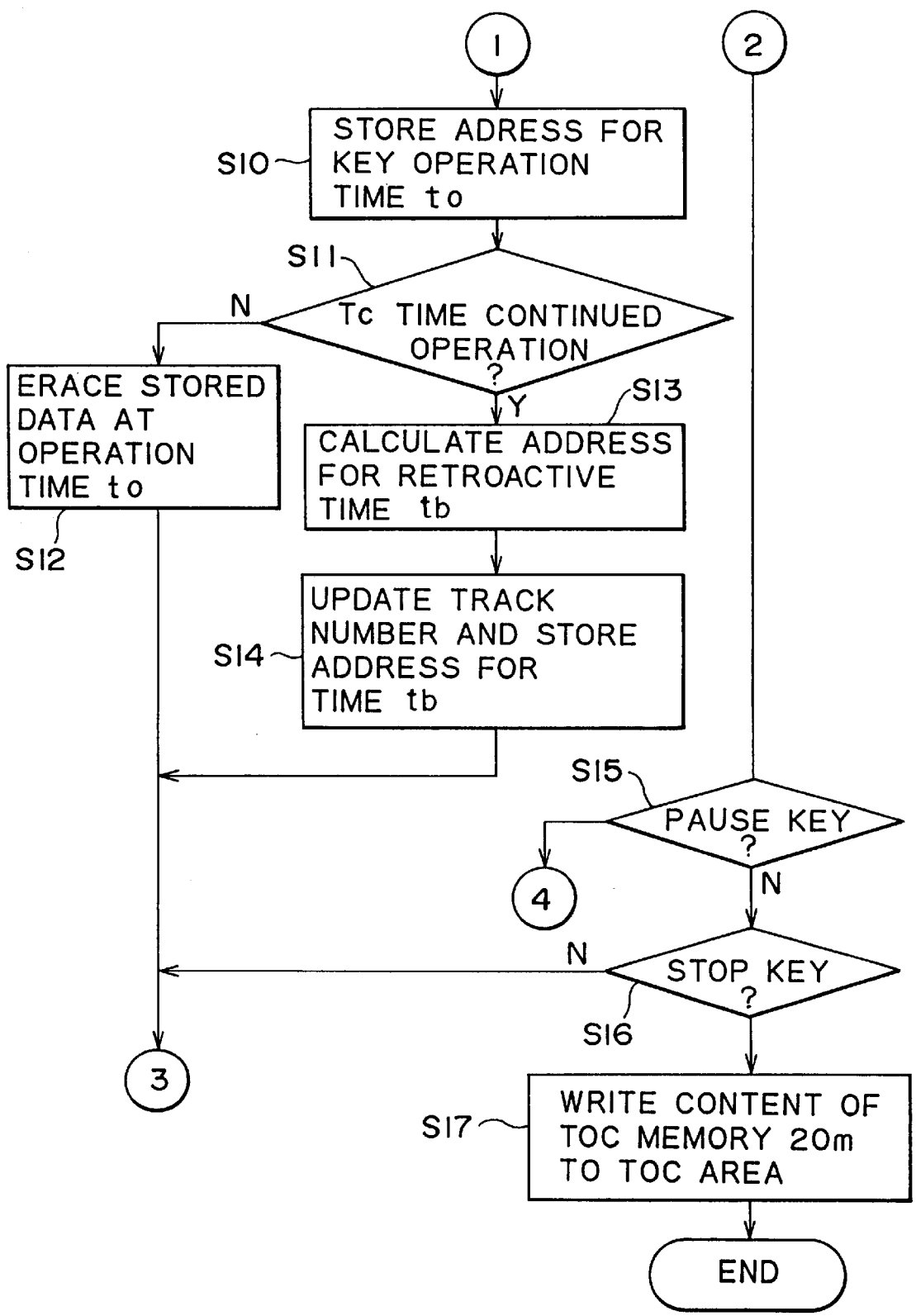
FIG. 3 is another part of the flowchart describing the operation of the disc recording apparatus according to the invention.

Now, referring to FIGS. 2 and 3, a marker recording operation in one embodiment of this invention will be described.

Before recording, an address on the disc 1 of marker Km operation point t0 is stored or an address of point tb retroactive from the operation point t0 by time $\Delta T$ ($=t0-\Delta T$) is stored depending on data to be recorded (step S1).

In this embodiment, the retroactive time $\Delta T$ can be set to any value. As mentioned earlier, when recording a lecture, this retroactive time $\Delta T$ is set to one to two seconds for example. When recording data whose contents are known beforehand as with music, the marker key Km may only be operated between pieces of music, so that the retroactive time may be set to zero to store the marker key Km operation point t0.

Then, in step S2, a key entry from a keyboard 41 is waited for. When a key entry is made, processing proceeds from step S2 to step S3. In step S3, it is determined whether an operated key is the record key Kr or not. If the operated key is not the record key Kr, the processing goes to a processing routine corresponding to the operated key. If the operated key is the record key Kr, the apparatus is put in a record standby state (step S4).

In step S5, a key entry from the keyboard 41 is waited for. When a key entry is made, the processing proceeds from step S5 to step S6. In step S6, it is determined whether an operated key is the playback key Kp or not. If the operated key is not the playback key Kp, the processing goes to a processing routine corresponding to the operated key. If the operated key is the playback key Kp, a recording operation starts and address of a preceding start point of an audio signal to be recorded is stored in the TOC memory 20m (step S7).

In this embodiment, during recording, the apparatus is kept in a state waiting for a key entry from the keyboard 41 (step S8). When a key entry is made, it is determined whether an operated key is the marker key Km or not (step S9). If the operated key is the marker key Km, the processing proceeds from step S9 to step S10 to store an address of operation point t0 in the TOC memory 20m.

In step S11, it is determined whether the marker key Km has been operated for one to two seconds of predetermined time Tc or not. If the continued operation time is less than Tc, the marker key operation is regarded as an inadvertent operation. The processing then goes from step S11 to step S12 where the address of the key operation point to stored in step S10 is erased from the TOC memory 20m. Then, the processing goes back to step S8.

Meanwhile, if the marker key Km has been continuously operated for Tc or longer, the processing goes from step S11 to step S13 to calculate an address of the marker point. That is, if the condition set in step S1 in accordance with the data to be recorded is $\Delta T \neq 0$, the microcomputer 20 calculates the point tb retroactive from the marker key Km operation point t0 by the time $\Delta T$ to obtain an address of the retroactive point tb. If $\Delta T=0$, the address of the marker key Km operation point t0 is the address of the retroactive point tb.

Then, the processing goes to step S14 where the track number stored in the TOC memory 20m is incremented by one and the address of the marker point of the above-mentioned tb is stored as a start address of the recorded data. That is, even if the marker key Km is operated at a position other than at the beggining of a piece of music or a recording start point, a track number of the recorded data is updated and its start address is stored.

The processing then goes back from step S14 to step S8. The above-mentioned series of operations from step S9 through step S14 by the marker key Km are iterated until the stop key Ks is operated in step S16.

If, in step S9, it is determined that the operated key is not the marker key Km, the processing goes from step S9 to step S15. In step 15, it is determined whether a pause key has been operated or not. If it is determined that the pause key has been operated, the processing goes back to step S4 and the apparatus gets in the recording standby state. If, in step 15, it is determined that the pause key has not been operated, then it is determined whether the stop key Ks has been operated or not. If it is determined that the stop key Ks has not been operated, the key operation is ignored as an operation error, upon which the processing goes back to step S16 to step S8. If the stop key Ks has been operated, the processing proceeds from step S16 to step S17. When the recording operation comes to an end, the TOC data including the address of the marker point tb stored in the memory 20m is written to a TOC area on the disc, upon which the recording operation of the recording/reproducing apparatus terminates.

Therefore, in reproduction, a desired marker point can be detected promptly based on each address written to the TOC area as mentioned above.

It will be apparent that, although the marker key Km is separately provided in the above-mentioned embodiment, the marker key Km may be provided integrally with the record key Kr for example.

In the above-mentioned embodiment, the invention has been applied to a disc apparatus for recording/reproducing compressed audio data intermittently. It will be apparent that the invention is applicable to any disc apparatus that uses a disc recorded with address data beforehand and records recording information such as the TOC and a directory in a particular area of the disc.

It should be noted that a time code can be used for the absolute address data on the disc.

As described and according to the invention, there is provided a disc recording apparatus which uses a disc recorded with address data beforehand and writes the TOC (information about recorded data) in a predetermined area on the disc. When a predetermined key is operated during recording, an address on the disc corresponding to an operation point of the key is written to the predetermined area as the TOC, generating positional information for data retrieval which substantially has no offset from a marker point on the disc. In reproduction, the TOC is read before starting reproduction, so that a desired marker point can be detected promptly based on the positional information of the TOC data.

While the preferred embodiment of the invention has been described using specific terms, such description is for illustrative purpose only, and it is to be understood that changes and variations may be made without departing from the spirit or scope of the appended claims.

What is claimed is:

1. A magneto/optical disc recording apparatus which uses a disc recorded with address data beforehand and writes information about recorded data in a predetermined area on the disc comprising:

a marker key;

means for writing to a predetermined area as a table of contents (TOC) an address on a magneto/optical disk corresponding to an operation point at which said marker key is operated during recording;

means for generating positional information for data retrieval which substantially has no offset from a marker point on the disc; and means for reading said TOC before starting reproduction to detect said marker point promptly based on said positional information.

2. A disc recording apparatus as defined in claim 1, wherein the address for the operation point of the predetermined key is held in a temporary memory to be written to the predetermined area after an end of a data recording operation.

3. A disc recording apparatus as defined in claim 1, further comprising memory means for temporarily storing the address until the end of a data recording operation.

* * * * *